United States Patent [19]
Layton

[11] Patent Number: 5,158,586
[45] Date of Patent: Oct. 27, 1992

[54] HEPA FILTER UNIT HAVING A METALLIC MEMBRANE

[76] Inventor: Howard M. Layton, Lazy Acres 14 Satterlee Rd., New Fairfield, Conn. 06812

[21] Appl. No.: 817,329

[22] Filed: Jan. 6, 1992

[51] Int. Cl.$^5$ .............................................. B01D 46/10
[52] U.S. Cl. ...................................... 55/497; 55/500; 55/521; 55/523
[58] Field of Search ................. 55/497, 500, 502, 521, 55/523

[56] References Cited

U.S. PATENT DOCUMENTS

| | | | |
|---|---|---|---|
| 3,248,183 | 4/1966 | Powell et al. | 55/523 X |
| 4,114,794 | 9/1978 | Storms | 55/523 X |
| 4,122,015 | 10/1978 | Oda et al. | 55/523 X |
| 4,687,579 | 8/1987 | Bergman | 55/497 X |
| 4,903,617 | 2/1990 | Weber et al. | 55/523 X |

OTHER PUBLICATIONS

Astrocel Brochure No. CAD-1-110-E, American Air Filter, Jul. 1984.

*Primary Examiner*—Charles Hart
*Attorney, Agent, or Firm*—Michael Ebert

[57] ABSTRACT

A submicron particle filter unit of the Hepa type adapted to be interposed between a source of pressurized gas and a work-processing region to provide an environment therefor free of particles and other contaminants. The membrane of the unit is fabricated from a continuous, elongated, porous metal sheet accordion-folded to define a uniform series of pleats forming a media pack having an entry and an exit face, the pack being clamped with gaskets between the side plates of a frame or welded or otherwise joined thereto. Pressurized gas from the source applied to the entry face of the pack is filtered therethrough to yield at its exit face a laminar flow of gas which creates a clean environment for the work-producing region.

7 Claims, 1 Drawing Sheet

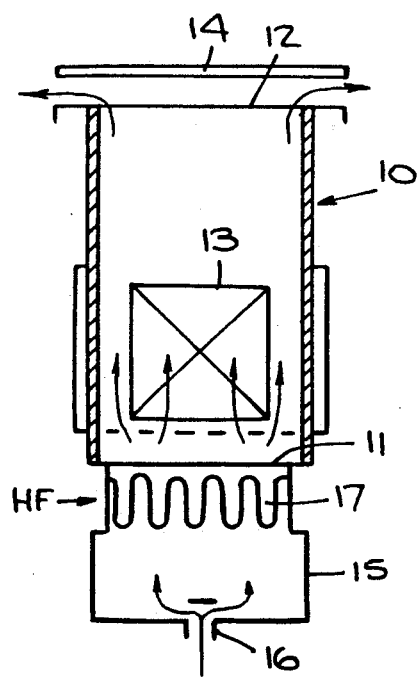
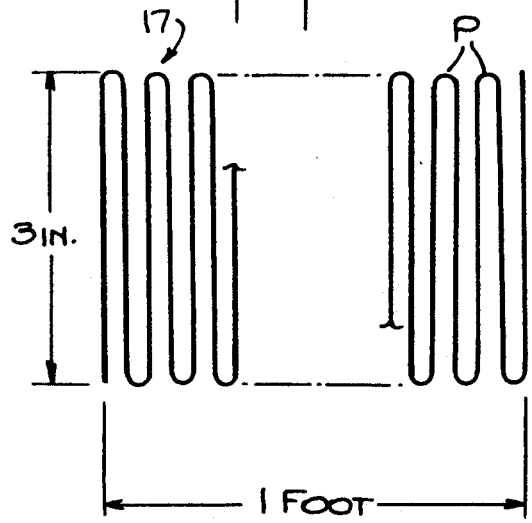
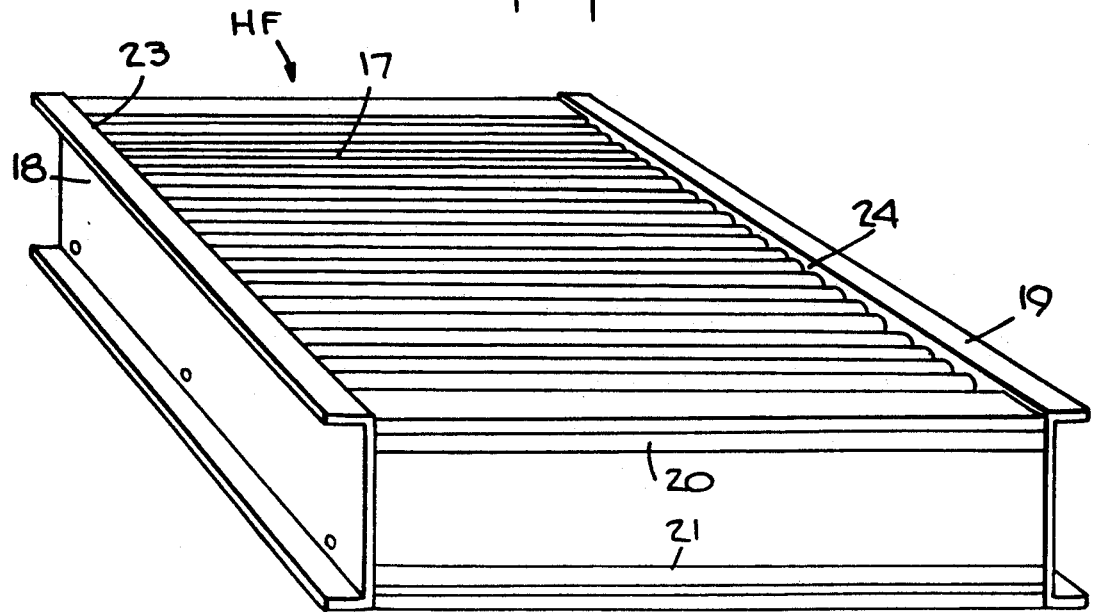

HEPA FILTER UNIT HAVING A METALLIC MEMBRANE

BACKGROUND OF INVENTION

1. Field of Invention

This invention relates generally to submicron particle filter units of the Hepa type, and more particularly to a unit whose membrane is fabricated of a continuous porous metal sheet accordion-folded to define a uniform series of pleats forming a media pack that is held within a frame.

2. Status of Prior Art

My above-identified copending application discloses a laminar flow system for drying microelectronic, optical and other parts that in the course of their processing are rendered wet with solvents or other liquids, which if not fully evaporated from the parts will contaminate them and impair their quality. The system includes an open-ended drying chamber having intermediate its sides a work zone which the parts to be dried are supported for exposure to a gas stream. One end of the chamber defines a gas inlet to admit the gas stream which sweeps the entire chamber. Adjoining the drying chamber at its inlet is a pressure chamber in which a submicron particle filter unit of the Hepa type producing a relatively low pressure drop is disposed to cover the gas inlet.

Pressurized gas fed into the pressure chamber and heated to an elevated temperature imposes a distributed pressure on the entry face of the Hepa filter unit and passes therethrough to yield at its exit face a laminar stream of hot gas that subjects the parts in the work zone to a substantially uniform drying action, so that all parts being treated are fully dried.

A conventional Hepa filter unit is mainly composed of a continuous sheet of non-woven, non-combustible microglass fibers having high tensile strength and water-repellant properties. This non-woven sheet is accordion-folded over narrow fluted corrugated aluminum separators supported within a frame and bonded thereto by sealants. Also provided are gaskets on either face of the frame to form a leak-proof seal at the air exit and entry faces of the filter unit.

A commercial Hepa filter unit of this type is available commercially under the trademark MICROFLO from the High Efficiency Filter Corp. of Eatontown, N.J. While a standard Hepa filter unit can withstand temperatures as high as 220° F., in the drying system disclosed in my copending application in which air or nitrogen gas is heated to as high as 200° C. in order to promote rapid evaporation, it is essential that the Hepa filter unit be capable of functioning at elevated temperatures. To this end, the unit disclosed in my copending application is provided with sealants, gaskets and frames fabricated of material capable of withstanding the elevated temperatures to which the unit is subjected.

The MICROFLO Hepa filter unit is constituted by a filter media pack constructed from a continuous sheet of non-woven microglass fibers bonded with acrylic resin. The media pack is permanently sealed within a cell made of particle board or other material by rubber-based adhesive sealants.

It has been found that when a Hepa type filter unit, whose membrane is formed of a pleated sheet of non-woven fiberglass material, is incorporated in a laminar flow drying system of the type disclosed in my copending application, because of the elevated temperatures involved and the chemical nature of the bonding and sealing agents, gases are evolved from these agents. The resultant out-gassing in some instances gives rise to unacceptable levels of contamination in the work being dried, particularly in the case of microelectronic parts.

The use of Hepa type filter units is by no means limited to parts drying systems, for these filters are widely used in the design of so-called "clean rooms" to create a particle-free, pure environment suitable for fabricating micro-circuits and other critical components, as well as in the production of pharmaceuticals and biologicals. Hepa type filter units are also commonly employed in association with laminar flow clean hoods and in other equipment dictating a particle-free, critically-clean environment.

For many applications, commercially-available Hepa filter units whose membrane is formed of a pleated fiberglass sheet perform in a satisfactory manner, and to the extent that out-gassing is experienced by reason of sealants and bonding agents included in these units, it is tolerable. But as the technology of miniaturization continues to advance and as micro devices in the course of their manufacture become increasingly intolerant of even slight traces of contaminants in the environment, then even minimal amounts of out-gassing constituents which become entrained in the air or nitrogen stream from the Hepa filter unit have been found to be unacceptable.

Moreover, in certain applications where the nature of the equipment is such as to dictate a heated gas environment, such as in an air or nitrogen drying oven, the out-gassing propensity of sealants and bonding agents included in known types of Hepa filters becomes greater, and the risk of contaminating the controlled environment which it serves is thereby increased.

SUMMARY OF INVENTION

In view of the foregoing, the primary object of the invention is to provide a submicron particle filter unit of the Hepa type which is not subject to out-gassing and is therefore usable in creating a clean environment in a work-processing region which cannot tolerate even minimal amounts of contaminants.

More specifically, an object of this invention is to provide a Hepa filter unit of the above type whose membrane is fabricated of a continuous porous metal sheet, the membrane being devoid of chemical bonding agents susceptible to out-gassing.

A significant advantage of a Hepa-type filter unit in accordance with the invention is that it is usable to filter gases heated to elevated temperatures, such as are required in a parts drying system where the inclusion of sealing and bonding agents in the unit results in out-gassing that renders the environment in the work-processing region unacceptable.

Also an object of the invention is to provide a submicron particle filter unit of the Hepa type that has a long effective life and lends itself to mass production at low cost.

Briefly stated, these objects are attained in a submicron particle filter unit of the Hepa type adapted to be interposed between a source of pressurized gas and a work-processing region to provide an environment therefor free of particles and other contaminants. The membrane of the unit is fabricated from a continuous, elongated, porous metal sheet accordion-folded to define a uniform series of pleats forming a media pack having an entry and an exit face, the pack being clamped with gaskets between the side plates of a frame or welded or otherwise joined thereto. Pressurized gas from the source applied to the entry face of the pack is filtered therethrough to yield at its exit face a laminar flow of gas which creates a clean environment for the work-processing region.

BRIEF DESCRIPTION OF DRAWING

For a better understanding of the invention as well as other objects and further features thereof, reference is made to the following detailed description to be read in conjunction with the accompanying drawings, wherein:

FIG. 1 schematically shows a single-pass air or nitrogen drying system which includes a submicron particle filter unit of the Hepa-type in accordance with the invention;

FIG. 2 is a perspective view of the Hepa-type unit; and

FIG. 3 illustrates the relative dimensions of the media pack included in the unit.

DESCRIPTION OF INVENTION

The System

FIG. 1 shows a single-pass air or nitrogen drying system that includes a Hepa-type filter unit in accordance with the invention. The system is provided with an open-ended drying chamber 10 having a rectangular cross section, the lower end defining a gas inlet 11 and the upper end defining a gas outlet 12.

Disposed within drying chamber 10 intermediate its side walls is a work zone 13 in which the parts to be dried are supported. Because of this arrangement, and as indicated by the flow arrows, gas is free to flow through and around work zone 13 from inlet 11 to outlet 12 where the gas discharged from the chamber is intercepted by a baffle 14 spaced from the upper end of the chamber. As a result, the discharged gas is deflected outwardly by the baffle.

Coupled to the lower end of drying chamber 10 is a pressure chamber 15 having at its base an input port 16 into which heated air or nitrogen is fed under pressure. Mounted at the upper end of pressure chamber 15 is a box-like Hepa filter unit HF which covers inlet 11 of drying chamber 10 and therefore acts to intercept and filter the air or nitrogen before the gas is permitted to pass into the drying chamber.

Because pressure chamber 15 is enclosed by Hepa filter unit HF, gas admitted into this chamber through input port 16 fills this chamber and uniformly subjects the entry face of the unit to distributed pressure. The gas which is heated to an elevated temperature by a heater assembly external to the gas input port passes through the Hepa filter unit which acts to filter out not only particles borne by the gas but also scale and oxidation particles originating at the heater assembly.

The heated gas emerges from the exit face of filter unit HF as a laminar stream which flows through the drying chamber from inlet 11 to outlet 12 thereof. In doing so, the heated gas promotes uniform evaporative drying of the parts supported in work zone 13. Because the filter unit extends between the walls of the chamber, no stagnant pockets of gas are developed in the chamber.

The part drying system disclosed in FIG. 1 which incorporates a Hepa filter unit in accordance with the invention represents but one application of the unit, for the unit is usable in conjunction with any system or equipment that requires a clean environment devoid of particles or reactive gases, which if present in the gas stream would contaminate the work being processed.

The Hepa Filter Unit

As illustrated in FIG. 2, a submicron particle filter unit HF of the Hepa type in accordance with the invention includes a membrane 17 forming the media pack of the unit. Membrane 17 is fabricated from a continuous sheet of porous metal such as stainless steel, titanium, bronze, aluminum or nickel-copper alloy. Thus in the case of stainless steel, the sheet may be formed of sintered stainless steel powder whose interstices define minute pores which admit gas but reject particles borne by the gas. In practice, the steel sheet may have a thickness in the order of 0.01 inches, with the pores of about 0.5 microns. Alternatively, the porous metal sheet may be fabricated of tightly woven fine wires.

In order to provide a filter unit having a low pressure drop, a large membrane surface area is required; for the greater the surface area, the larger the number of pores which admit the gas and the lower the resultant pressure drop. If, therefore, the Hepa filter unit required for a given application is one having a one foot square face area, then in order to obtain within the confines of this face area a porous membrane presenting a much larger surface area, use is made of a continuous porous metal sheet having a width of one foot and a length of between 10 to 12 feet.

This elongated sheet is accordion-folded, as shown in FIG. 3, to create a uniform series of 40 to 48 pleats P having a depth of 3 inches to form a one foot square media pack. In this example, the spacing between the packs of the pleats is about 3/16 of an inch.

However, if an even lower pressure drop is required in a media pack having a one foot square face area, the media pack is fabricated from a porous metal sheet that is twice as long as in the previous example, this elongated sheet being accordion-folded to provide the same number of pleats in the uniform series thereof, but having a depth of 6 inches instead of 3 inches. For Hepa filter units having a larger face area, the membrane surface area is proportionately increased.

The media pack formed by membrane 17 is held within a frame which, as shown in FIG. 2, is formed by a pair of channel-shaped, stainless steel metal side plates 18 and 19 which are bridged at either end by upper and lower metal cross beams 20 and 21 having a T-shaped cross section.

The media pack formed by pleated membrane 17 is clamped between side plates 18 and 19 with gaskets 23 and 24 interposed between the inner walls of the plate and the extremities of the pleats.

The gaskets are preferably of a compliant fluorocarbon material, such as VITON, a fluoroelastomer capable of withstanding elevated temperatures in the range of 400° to 500° F. Suitable for this purpose is VITON A of about ⅛ inch thick and medium durometer.

Alternately, the extremities of the pleated membrane may be welded in an inert environment to the side plates. Or they may be mechanically locked to the side plates. To this end, the side plates may each consist of two mating sections provided with interlocking teeth having the same contour as the pleated membrane and acting to clamp the edges of the membrane between the mating sections. When so clamped, heliarc seam welding may readily be carried out.

In practice, instead of welding, the teeth of the mating clamp sections of the side plates may be faced with a compliant fluorocarbon material before the filter membrane is clamped between the two sections. Suitable material for this purpose is Teflon (PTFE) "string," layers of Teflon tape, fluorocarbon elastomers and U-shaped edgings, or Teflon-encapsulated elastomers in which strips of compliant material are encased in TFE, PFA, PVDF and other fluorocarbon materials.

While there has been shown and described a preferred embodiment of a Hepa filter unit having a metallic membrane in accordance with the invention, it will be appreciated that many changes and modifications may be made therein without, however, departing from the essential spirit thereof.

I claim:

1. A submicron particle filter unit of the Hepa type comprising:
   (a) a media pack free of bonding and sealing agents formed by a continuous porous metal sheet membrane accordion-folded to define a uniform series of pleats having an entry and an exit face, said membrane being formed from a sheet of sintered metal constituted by metal powders whose interstices form pores dispersed throughout the sheet and whose sizes are in the submicron range, the dimensions of the sheet being such as to provide a multitude of pores resulting in a relatively low pressure drop in gas through said membrane; and
   (b) a metal frame surrounding and supporting said media pack to form said unit, whereby when the unit is interposed between a source of pressurized gas and a work-processing region, pressurized gas from the source is applied to the entry face of the pack and is filtered therethrough to yield at its exit face a laminar flow of gas providing an environment for said region which is free of particles and other contaminants.

2. A unit as set forth in claim 1, in which the membrane is fabricated of sintered stainless steel.

3. A unit as set forth in claim 1, wherein the number of pleats in the series is at least 40 and in which said pleats have a depth of at least three inches, whereby the resultant membrane affords a large number of pores within the confines of said frame.

4. A unit as set forth in claim 1, in which said frame includes a pair of side plates and cross beams bridging said side plates.

5. A unit as set forth in claim 4, wherein the extremities of the pleats are welded to the side plates.

6. A unit as set forth in claim 4, wherein said pleated membrane is clamped between said side plates, a gasket being interposed between the inner wall of each side plate and the extremities of the pleats.

7. A unit as set forth in claim 6, wherein said gasket is composed of a fluoroelastomer material.

* * * * *